US012189490B2

(12) United States Patent
Ramadas et al.

(10) Patent No.: US 12,189,490 B2
(45) Date of Patent: Jan. 7, 2025

(54) METHOD, SYSTEM AND COMPUTER READABLE MEDIUM FOR THE AUTOMATED RECONSTRUCTION OF AN APPLICATION

(71) Applicant: JPMorgan Chase Bank, N.A., New York, NY (US)

(72) Inventors: Krishna Kumar Ramadas, Bournemouth (GB); Seshadri Srinivasan, Bangalore (IN); Fazlluddin Syed, Bengaluru (IN); Adarsh R Acharya, Hubli (IN); Tarun Bhuteja, Edison, NJ (US); Joshua A Jago, Milton Keynes (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 87 days.

(21) Appl. No.: 17/986,309

(22) Filed: Nov. 14, 2022

(65) Prior Publication Data
US 2024/0111632 A1 Apr. 4, 2024

(30) Foreign Application Priority Data
Sep. 30, 2022 (IN) .............................. 202211056371

(51) Int. Cl.
*G06F 11/14* (2006.01)
(52) U.S. Cl.
CPC .... *G06F 11/1458* (2013.01); *G06F 2201/865* (2013.01)
(58) Field of Classification Search
CPC .............................. G06F 11/14; G06F 11/1458
See application file for complete search history.

(56) References Cited

U.S. PATENT DOCUMENTS 7,464,147 B1 * 12/2008 Fakhouri ................ G06Q 10/04
  709/223
11,010,191 B1 * 5/2021 Hornbeck ............. H04L 67/133
  (Continued)

FOREIGN PATENT DOCUMENTS

CN  113190525 A  *  7/2021
CN  114064439 A  *  2/2022 ............ G06F 11/302

OTHER PUBLICATIONS

International Search Report and Written Opinion of the International Searching Authority issued in International Patent Application No. PCT/US22/49807 and dated Apr. 5, 2023.

*Primary Examiner* — Kamini B Patel
(74) *Attorney, Agent, or Firm* — Greenblum & Bernstein, P.L.C.

(57) ABSTRACT

A method, system and non-transitory computer-readable medium for automated reconstruction of an application. The method, the system, and the non-transitory computer-readable medium cause a processor: receive a workflow that comprises a sequence of microservice operations that correspond to the application; transfer, from a current host platform that is associated with the application, to a backup memory, a copy of an active database that is associated with the application; deactivate the active database from the current host platform; rebuild an operating system of the application; remove a pre-build configuration of the application; install a recovery mode of the application on the current host platform; deploy a post-build configuration of the application; perform a quality assurance process that comprises validating the post-build configuration of the application; and transfer from the backup memory to the current host platform, the copy of the active database.

20 Claims, 5 Drawing Sheets

(56) References Cited

U.S. PATENT DOCUMENTS

| | | | |
|---|---|---|---|
| 2002/0053044 A1* | 5/2002 | Gold | G06F 11/1417 |
| | | | 714/6.24 |
| 2021/0004226 A1* | 1/2021 | Gungabeesoon | G06F 8/71 |
| 2021/0263735 A1* | 8/2021 | Harishankar | G06F 8/31 |
| 2022/0091923 A1* | 3/2022 | O'Toole | G06F 9/453 |
| 2023/0125754 A1* | 4/2023 | Willett | G06Q 10/103 |
| | | | 717/102 |
| 2023/0125904 A1* | 4/2023 | Willett | G06F 16/21 |
| | | | 726/30 |
| 2023/0131898 A1* | 4/2023 | Willett | G06F 3/0482 |
| | | | 707/803 |

* cited by examiner

METHOD, SYSTEM AND COMPUTER READABLE MEDIUM FOR THE AUTOMATED RECONSTRUCTION OF AN APPLICATION

CROSS-REFERENCE TO RELATED APPLICATIONS

This application claims priority benefit from Indian Application No. 202211056371, filed Sep. 30, 2022, which is hereby incorporated by reference in its entirety.

BACKGROUND

1. Field of the Disclosure

This technology generally relates to a method, system and computer-readable medium for an automated reconstruction of an application, and more particularly to a method, system and computer-readable medium for automatically reconstructing an application in order to update application nodes end-to-end or, in the case of a disaster, to quickly recover and restore the application nodes end-to-end, with their data, to a state that the application nodes had before the disaster.

2. Background Information

The reconstruction of an application is often required in order to update the application or, in the case of a disaster, to recover and restore the application to a state that it had before the disaster. Conventionally, the reconstruction of an application generally requires coordinating an extensive array of tedious and cumbersome manual tasks, which makes the reconstruction unlikely to quickly update or quickly recover and restore the application from a disaster and, also, makes it impractical to regularly reconstruct the application on a daily, weekly, or even a monthly basis. As a result, the application is often left susceptible to vulnerabilities and unnecessary downtime, and the optimal integrity of the application cannot always be guaranteed.

Accordingly, there is a need to solve these problems with a more efficient approach to the reconstruction of an application.

SUMMARY

The present disclosure, through one or more of its various aspects, embodiments, and/or specific features or sub-component, provides, inter alia, various systems, servers, devices, methods, media, programs, and platforms for an automated reconstruction of an application.

According to an aspect of the present disclosure, a method is provided for an automated reconstruction of an application. The method is implemented by a processor that comprises one or more devices. The method comprises: receiving, by the processor, a workflow that comprises a sequence of microservice operations that correspond to the application; transferring, by the processor, from a current host platform that is associated with the application, to a backup memory, a copy of an active database that is associated with the application; deactivating, by the processor, the active database from the current host platform; rebuilding, by the processor, an operating system of the application; removing, by the processor, a pre-build configuration of the application; installing, by the processor, a recovery mode of the application on the current host platform; deploying, by the processor, a post-build configuration of the application; performing, by the processor, a quality assurance process that comprises validating the post-build configuration of the application; and transferring, by the processor, from the backup memory to the current host platform, the copy of the active database.

The application may comprise: a monolithic software application.

The workflow may further comprise: a directed acyclic graph (DAG) that indicates an order by which the microservice operations are executed when the workflow is performed.

The method may further comprise: synchronizing, by the processor, execution of the application across a plurality of nodes, where the current host platform may comprise a cluster that comprises the plurality of nodes.

The method may further comprise: executing, by the processor, an artificial intelligence (AI) algorithm that implements a machine learning technique that determines a set of parameters for the post-build configuration, where the AI algorithm may have been trained by using historical data that relates to at least one previous reconstruction of the application.

The method may further comprise: after validation of the post-build configuration of the application, executing, by the processor, the sequence of microservice operations; and when execution of the sequence of microservice operations is successful, transmitting, by the processor, to a predetermined destination, a notification that each of the microservice operations has been successfully executed.

The method may further comprise: after validation of the post-build configuration of the application, executing, by the processor, the sequence of microservice operations; when execution of the sequence of microservice operations is successful, transmitting, by the processor, to a predetermined destination, a notification that each of the microservice operations has been successfully executed; and displaying, by the processor, on a graphical user interface (GUI), a result of the execution of the sequence of microservice operations.

The validation of the post-build configuration of the application may comprise: valuating parameters of the post-build configuration; and evaluating the workflow.

The validation of the post-build configuration of the application may comprise: determining whether to request a change to the post-build configuration of the application.

The method may further comprise after validation of the post-build configuration of the application, executing, by the processor, the sequence of microservice operations; and when execution of the sequence of microservice operations is successful, executing, by the processor, the post-build configuration of the application.

According to another aspect of the present disclosure, a system is provided for an automated reconstruction of an application. The system may comprise: a communication interface; a processor coupled to the communication interface and comprising one or more devices; and a memory coupled to the communication interface and storing executable instructions. The executable instructions may cause the processor to: receive a workflow that comprises a sequence of microservice operations that correspond to the application; transfer, from a current host platform that is associated with the application, to a backup memory, a copy of an active database that is associated with the application; deactivate the active database from the current host platform; rebuild an operating system of the application; remove a pre-build configuration of the application; install a recovery mode of the application on the current host platform;

deploy a post-build configuration of the application; perform a quality assurance process that comprises validating the post-build configuration of the application; and transfer, from the backup memory to the current host platform, the copy of the active database.

The application may comprise a monolithic software application.

The workflow may further comprise a directed acyclic graph (DAG) that indicates an order by which the microservice operations are executed when the workflow is performed.

The executable instructions may further cause the processor to: synchronize execution of the application across a plurality of nodes, wherein the current host platform may comprise a cluster that comprises the plurality of nodes.

The executable instructions may further cause the processor to: execute an artificial intelligence (AI) algorithm that implements a machine learning technique that determines a set of parameters for the post-build configuration, wherein the AI algorithm may have been trained by using historical data that relates to at least one previous reconstruction of the application.

The executable instructions may further cause the processor to: after validation of the post-build configuration of the application, execute the sequence of microservice operations; when execution of the sequence of microservice operations is successful, transmit, to a predetermined destination, a notification that each of the microservice operations has been successfully executed; and display, on a graphical user interface (GUI), a result of the execution of the sequence of microservice operations.

Validation of the post-build configuration of the application may comprise: evaluating parameters of the post-build configuration; and evaluating the workflow.

The validation of the post-build configuration of the application may comprise: determining whether to request a change to the post-build configuration of the application.

The executable instructions may further cause the processor to: after validation of the post-build configuration of the application, execute the sequence of microservice operations; and when execution of the sequence of microservice operations is successful, execute the post-build configuration of the application.

According to yet another aspect of the present disclosure, a non-transitory computer-readable medium is provided for an automated reconstruction of an application. The non-transitory computer-readable medium may store executable instructions. When executed by a processor, the executable instructions may cause the processor to: receive a workflow that comprises a sequence of microservice operations that correspond to the application; transfer, from a current host platform that is associated with the application, to a backup memory, a copy of an active database that is associated with the application; deactivate the active database from the current host platform; rebuild an operating system of the application; remove a pre-build configuration of the application; install a recovery mode of the application on the current host platform; deploy a post-build configuration of the application; perform a quality assurance process that comprises validating the post-build configuration of the application; and transfer, from the backup memory to the current host platform, the copy of the active database.

The application may comprises a monolithic software application.

The workflow further may comprise a directed acyclic graph (DAG) that indicates an order by which the microservice operations are executed when the workflow is performed.

The executable instructions may further cause the processor to: synchronize execution of the application across a plurality of nodes, wherein the current host platform may comprise a cluster that comprises the plurality of nodes.

The executable instructions further cause the processor to: execute an artificial intelligence (AI) algorithm that implements a machine learning technique that determines a set of parameters for the post-build configuration, wherein the AI algorithm may have been trained by using historical data that relates to at least one previous reconstruction of the application.

The executable instructions may further cause the processor to: after validation of the post-build configuration of the application, execute the sequence of microservice operations; when execution of the sequence of microservice operations is successful, transmit, to a predetermined destination, a notification that each of the microservice operations has been successfully executed; and display, on a graphical user interface (GUI), a result of the execution of the sequence of microservice operations.

Validation of the post-build configuration of the application may comprise: evaluating parameters of the post-build configuration; and evaluating the workflow.

Validation of the post-build configuration of the application may comprise: determining whether to request a change to the post-build configuration of the application.

The executable instructions may further cause the processor to: after validation of the post-build configuration of the application, execute the sequence of microservice operations; and when execution of the sequence of microservice operations is successful, execute the post-build configuration of the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
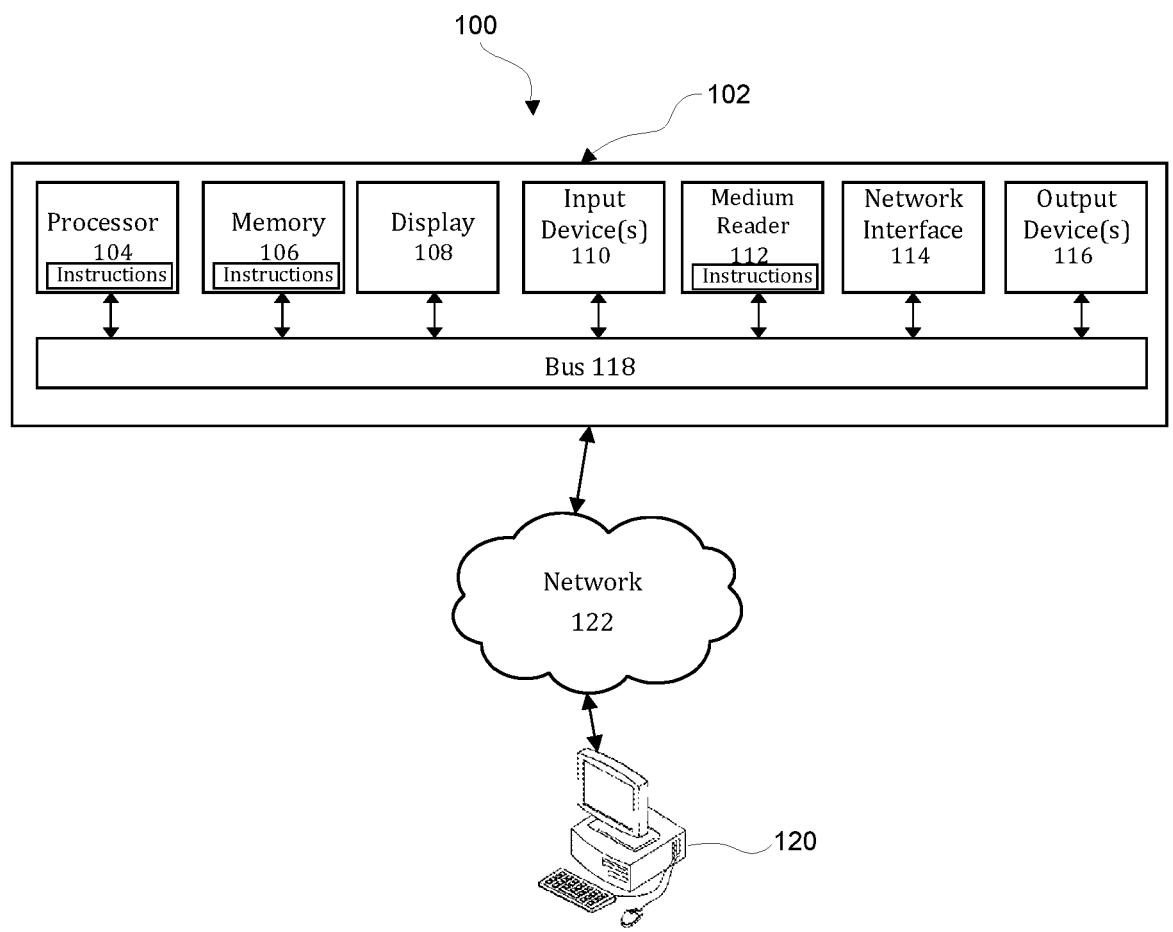
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically reconstructing an application in order to update application nodes end-to-end or, in the case of a disaster, to quickly recover and restore the application nodes end-to-end, with their data, to a state that the application nodes had before the disaster.

Figure 2:
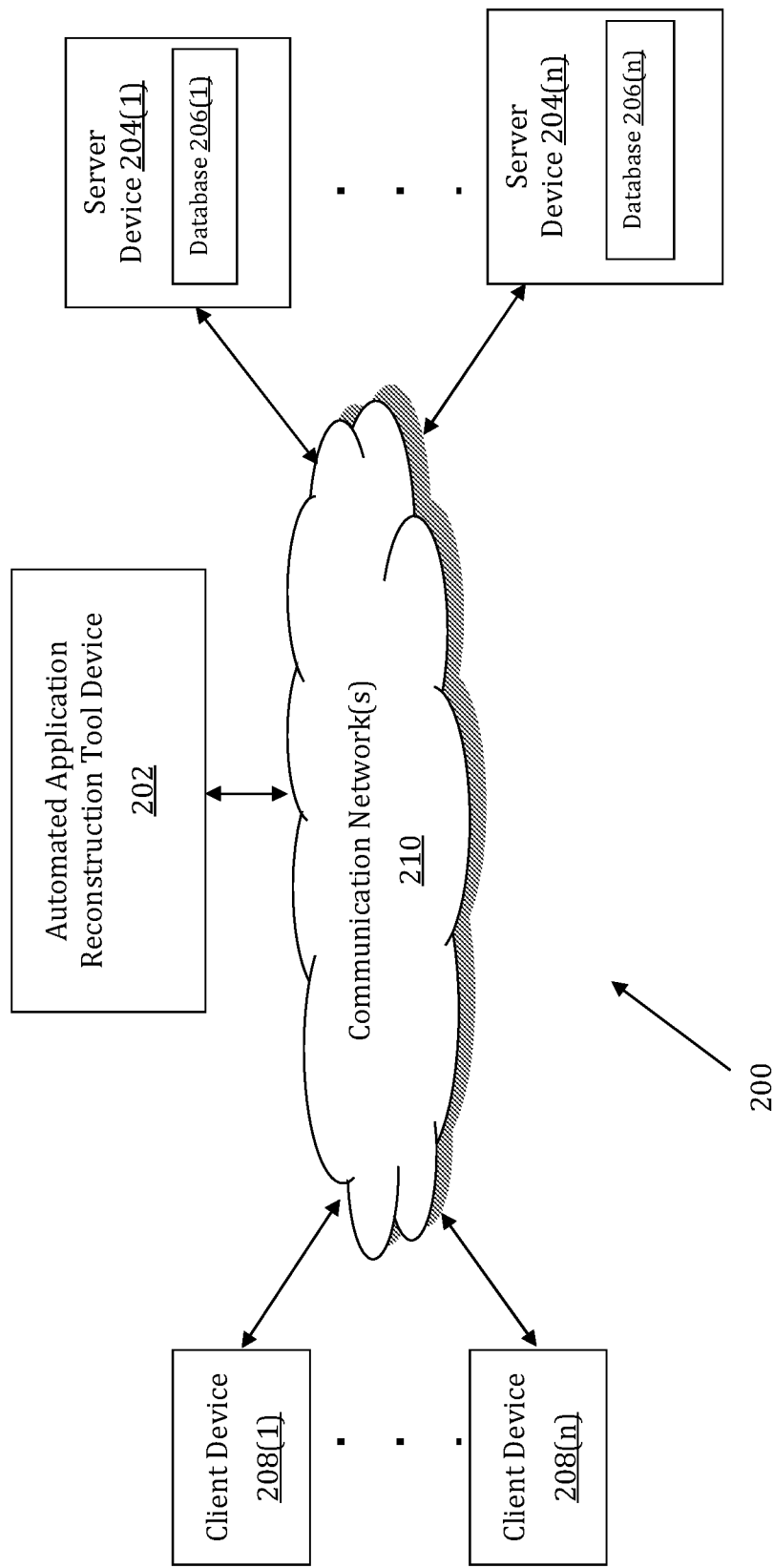
FIG. 2 illustrates an exemplary diagram of a network environment.

Referring to FIG. 2, a schematic of an exemplary network environment 200 for implementing a method for automatically reconstructing an application is illustrated. In an exemplary embodiment, the method is executable on any networked computer platform, such as, for example, a personal computer (PC).

The method for automatically reconstructing an application may be implemented by an Automated Application Reconstruction Tool (AART) device 202. The AART device 202 may be the same or similar to the computer system 102 as described with respect to FIG. 1. The AART device 202 may store one or more applications that can include executable instructions that, when executed by the AART device 202, cause the AART device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AART device 202 itself, may be located in virtual server(s) running in a cloud-based computing environment rather than being tied to one or more specific physical network computing devices. Also, the application(s) may be running in one or more virtual machines (VMs) executing on the AART device 202. Additionally, in one or more embodiments of this technology, virtual machine(s) running on the AART device 202 may be managed or supervised by a hypervisor.

In the network environment 200 of FIG. 2, the AART device 202 is coupled to a plurality of server devices 204(1)-204(n) that hosts a plurality of databases 206(1)-206(n), and also to a plurality of client devices 208(1)-208(n) via communication network(s) 210. A communication interface of the AART device 202, such as the network interface 114 of the computer system 102 of FIG. 1, operatively couples and communicates between the AART device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AART device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and AART devices that efficiently implement a method for automatically reconstructing an application in order to update application nodes end-to-end or, in the case of a disaster, to quickly recover and restore the application nodes end-to-end, with their data, to a state that the application nodes had before the disaster.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AART device 202 may be a standalone device or integrated with one or more other devices or apparatuses, such as one or more of the server devices 204(1)-204(n), for example. In one particular example, the AART device 202 may include or be hosted by one of the server devices 204(1)-204(n), and other arrangements are also possible. Moreover, one or more of the devices of the AART device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AART device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical data that relates to application configurations and reconstructions and a library of workflow and microservice operations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AART device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AART device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AART device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AART device 202, the server devices 204(1)-204(n), or the client devices 208(1)-208(n), for example, may be configured to operate as virtual instances on the same physical machine. In other words, one or more of the AART device 202, the server devices 204(1)-204(n), or the client devices 208(1)-208(n) may operate on the same physical device rather than as separate devices communicating through communication network(s) 210. Additionally, there may be more or fewer AART devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
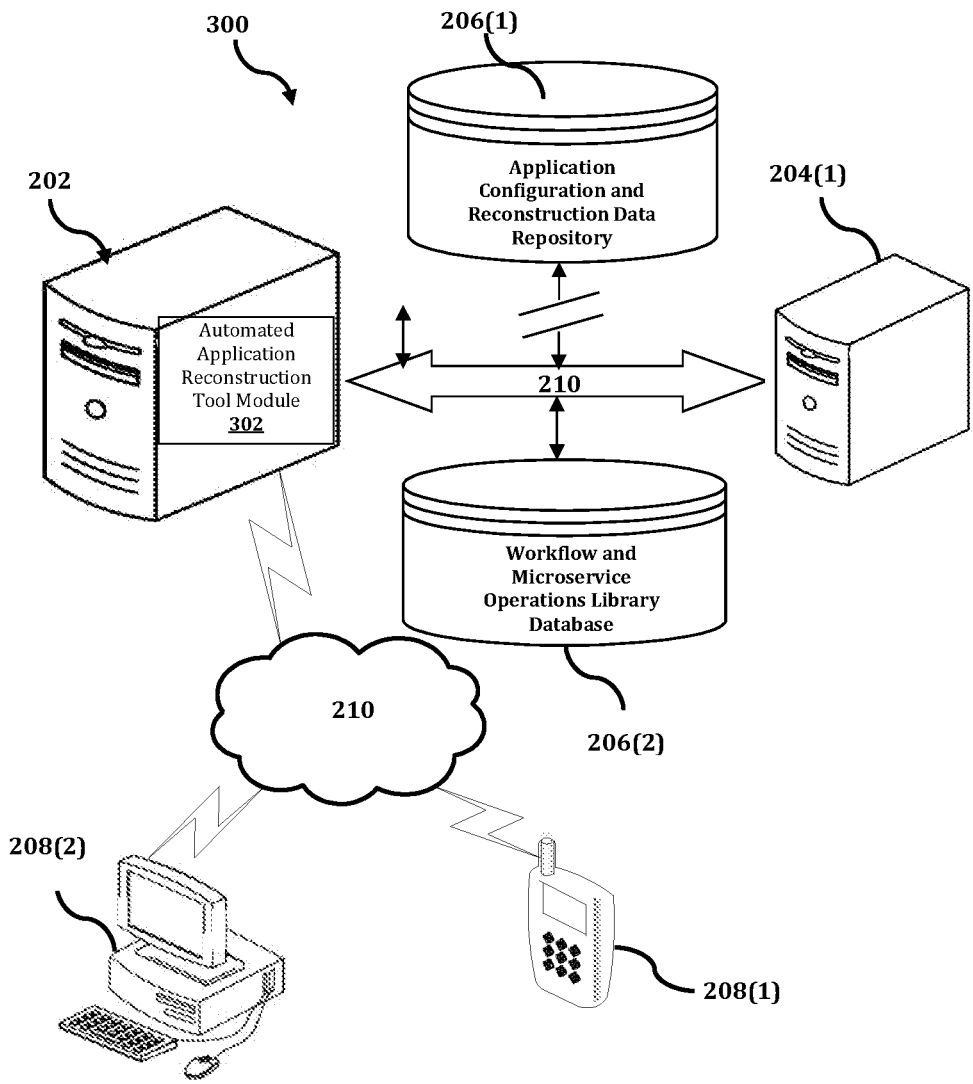
FIG. 3 shows an exemplary system for implementing a method for automatically reconstructing an application in order to update application nodes end-to-end or, in the case of a disaster, to quickly recover and restore the application nodes end-to-end, with their data, to a state that the application nodes had before the disaster.

The AART device 202 is described and illustrated in FIG. 3 as including an automated application reconstruction tool module 302, although it may include other rules, policies, modules, databases, or applications, for example. As will be described below, the automated application reconstruction tool module 302 is configured to implement a method for automatically reconstructing an application in order to update application nodes end-to-end or, in the case of a disaster, to quickly recover and restore the application nodes end-to-end, with their data, to a state that the application nodes had before the disaster.

An exemplary process 300 for automatically reconstructing an application by utilizing the network environment of FIG. 2 is illustrated as being executed in FIG. 3. Specifically, a first client device 208(1) and a second client device 208(2) are illustrated as being in communication with AART device 202. In this regard, the first client device 208(1) and the second client device 208(2) may be "clients" of the AART device 202 and are described herein as such. Nevertheless, it is to be known and understood that the first client device 208(1) and/or the second client device 208(2) need not necessarily be "clients" of the AART device 202, or any entity described in association therewith herein. Any additional or alternative relationship may exist between either or both of the first client device 208(1) and the second client device 208(2) and the AART device 202, or no relationship may exist.

Further, AART device 202 is illustrated as being able to access an application configuration and reconstruction data repository 206(1), and a workflow and microservice operations library database 206(2). The automated application reconstruction tool module 302 may be configured to access these databases for implementing a method for automatically reconstructing an application in order to update application nodes end-to-end or, in the case of a disaster, to quickly recover and restore the application nodes end-to-end, with their data, to a state that the application nodes had before the disaster.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AART device 202 via broadband or cellular communication. Of course, these embodiments are merely exemplary and are not limiting or exhaustive.

Automated application reconstruction tool module 302 may execute a process for automatically reconstructing an application in order to update application nodes end-to-end or, in the case of a disaster, to quickly recover and restore the application nodes end-to-end, with their data, to a state that the application nodes had before the disaster. An exemplary process for an automated reconstruction of an application is generally indicated at flowchart 400 in FIG. 4.

Figure 4:
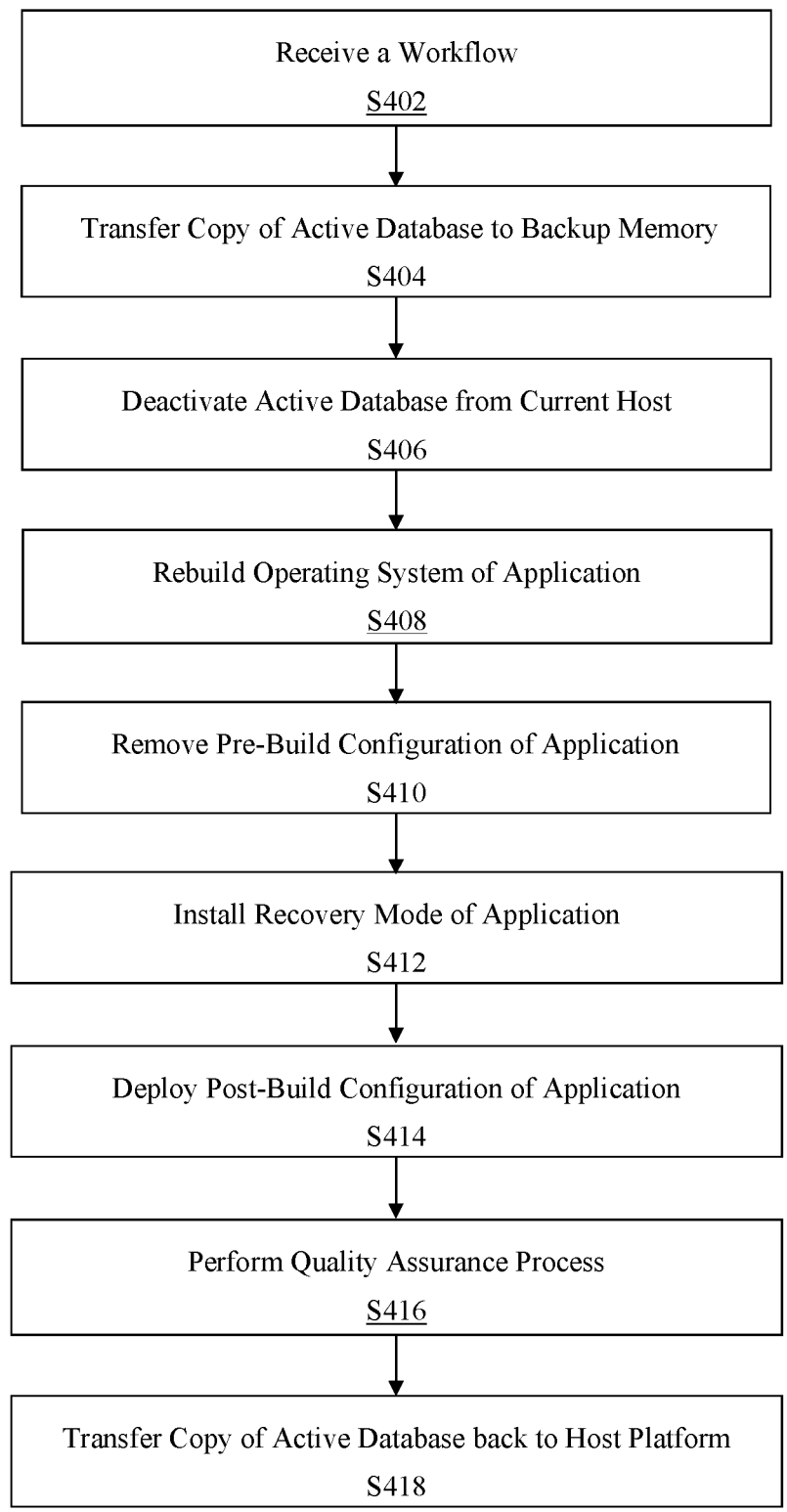
FIG. 4 is a flowchart of an exemplary process for implementing a method for implementing a method for automatically reconstructing an application in order to update application nodes end-to-end or, in the case of a disaster, to quickly recover and restore the application nodes end-to-end, with their data, to a state that the application nodes had before the disaster.

In process 400 of FIG. 4, at step S402, the automated application reconstruction tool module 302 receives a workflow that may comprise a sequence of microservice operations that correspond to an application. The workflow may further comprise a directed acyclic graph (DAG) that indicates an order by which the microservice operations are executed when the workflow is performed, and the application may comprise a monolithic software application, which may be a server such as, for example, an email server.

Workflows may be created for various purposes and by a variety of means, including according to a blueprint process. For example, a workflow may be created for the purpose of reconstructing an application, an operating system of an application, or both. A workflow may also be created for pre-requisite installations, such as an installation of pre-requisite executable instructions, parameters, or both. For example, pre-requisite installations may include an installation of Blackout, CyberArk, Dynatrace, binaries of an application, etc. Pre-requisite installations may be performed before an application is reconstructed. Initial microservice operations of a workflow that reconstructs an application may comprise pre-requisite installations. Workflows may be stored in workflow and microservices operations library database 206(2)

A workflow may be created automatically according to an automated process that utilizes executable instructions, artificial intelligence, machine learning, neural networks, etc. An automated process may access application configuration and reconstruction data repository 206(1), and workflow and microservice operations library database 206(2), in order to create a workflow. An automated process may utilize information from access application configuration and reconstruction data repository 206(1), and workflow and microservice operations library database 206(2), in order to determine how to create a workflow. An automated process may determine how to create a workflow by utilizing information from access application configuration and reconstruction data repository 206(1), and workflow and microservice operations library database 206(2), in order to train the automated process. An automated process that has been trained may learn from information from access application configuration and reconstruction data repository 206(1), and workflow and microservice operations library database 206(2).

For example, an automated process may be an artificial intelligence algorithm. An artificial intelligence algorithm may be trained by using information from access application configuration and reconstruction data repository 206(1), and workflow and microservice operations library database 206(2). Information from the access application configuration and reconstruction data repository 206(1), and the workflow and microservice operations library database 206(2), may include historical data that relates to at least one previous reconstruction of an application. An artificial intelligence algorithm may implement a machine learning technique. A machine learning technique may determine a set of parameters for a post build configuration of an application.

As another option, a workflow may be created manually by an individual. Additionally, each member of a team that includes more than one individual, may manually create a workflow. The workflow created by each member of a team may be utilized individually or as a compilation of workflows. A compilation of workflows may be compiled into, and handled as, a single workflow.

A workflow may be created for the purpose of mounting one or more databases. Mounting one or more databases may include activating one or more databases. Activating one or more databases may include transferring a copy of an active database, from a backup memory, to a current host platform of an application. A workflow may also be created for re-balancing one or more database copies. Re-balancing one or more database copies may ensure that a directed acyclic graph (DAG) is not in a failover state.

At step S404, automated application reconstruction tool module 302 transfers a copy of an active database, from a current host platform that is associated with an application, to a backup memory. Automated application reconstruction tool module 302 may utilize a workflow created for the purpose of backing up a database, in order to transfer a copy of an active database, from a current host platform that is associated with an application, to a backup memory. A current host platform that is associated with an application may include one or more clusters, which each may include a plurality of nodes.

At step S406, automated application reconstruction tool module 302 deactivates an active database from a current host platform that is associated with an application. Deactivating a database from a host platform may include shutting down the active database of the host platform. Automated application reconstruction tool module 302 may utilize a workflow created for the purpose of deactivating a database, in order to deactivate an active database from a current host platform that is associated with an application.

At step S408, automated application reconstruction tool module 302 rebuilds an operating system of an application. Rebuilding an operating system of an application may include recovering a state that the operating system of the application had before the operating system of the application was rebuilt. Automated application reconstruction tool module 302 may utilize a workflow created for the purpose of rebuilding an operating system, in order to rebuild an operating system of an application.

At step S410, automated application reconstruction tool module 302 removes a pre-build configuration of an application. Automated application reconstruction tool module 302 may utilize a workflow created for the purpose of removing a pre-build configuration of an application, in order to remove a prebuild configuration of an application.

At step S412, automated application reconstruction tool module 302 installs a recovery mode of an application. Automated application reconstruction tool module 302 may utilize a workflow created for the purpose of installing a recovery mode of an application, in order to install a recovery mode of an application. Installing a recovery mode of an application may include, or may be followed by, a synchronization of an execution of the recovery mode of the application across a plurality of nodes of a cluster of a platform of the application.

At step S414, automated application reconstruction tool module 302 deploys a post-build configuration of an application. Automated application reconstruction tool module 302 may utilize a workflow created for the purpose of deploying a post-build configuration of an application, in order to deploy a post-build configuration of an application. Deploying a post-build configuration of an application may include, or may be followed by, a synchronization of an execution of the post-build configuration of the application across a plurality of nodes of a cluster of a platform of the application.

At step S416, automated application reconstruction tool module 302 performs a quality assurance process. Automated application reconstruction tool module 302 may utilize a workflow created for the purpose of performing a quality assurance process, in order to perform a quality assurance process. Performing a quality assurance process may include validating a post-build configuration of an application. Validating a post-build configuration of an application may include evaluating parameters of the post-build configuration of an application, evaluating a workflow, or both.

A validation of a post-build configuration of an application may determine whether to request a change to the post-build configuration of the application. For example, when a validation of a post-build configuration of an application indicates an invalidity, automated application reconstruction tool module 302 may request a change that addresses the invalidity. Additionally, once the invalidity has been addressed, automated application reconstruction tool module 302 may perform another quality assurance process. A change to the post-build configuration of the application may require a generation of a change ticket.

After validating the post-build configuration of the application, automated application reconstruction tool module 302 may perform a workflow created for the purpose of reconstructing an application. Performing a workflow may include executing a sequence of microservice operations that are included within the workflow. When execution of a sequence of microservice operations is successful, automated application reconstruction tool module 302 may transmit, to a predetermined destination, a notification that each of the microservice operations has been successfully executed. The result of the execution of the sequence of microservice operations may be displayed on a graphical user interface (GUI).

At step S418, automated application reconstruction tool module 302 may mount one or more databases. Automated application reconstruction tool module 302 may mount one or more databases by transferring a copy of an active database, from a backup memory, to a current host platform of an application. Automated application reconstruction tool module 302 may utilize a workflow created for the purpose of mounting one or more databases, in order to transfer a copy of an active database, from a backup memory, to a current host platform of an application. Performing a workflow may include executing a sequence of microservice operations that are included within the workflow.

When an execution of a sequence of microservice operations that are included within a workflow created for the purpose of mounting one or more databases, and an execution of a sequence of microservice operations that are included within a workflow created for the purpose of reconstructing an application, are both successful, then a reconstructed application may be executed, and services of the application may be provided or fully restored.

Figure 5:
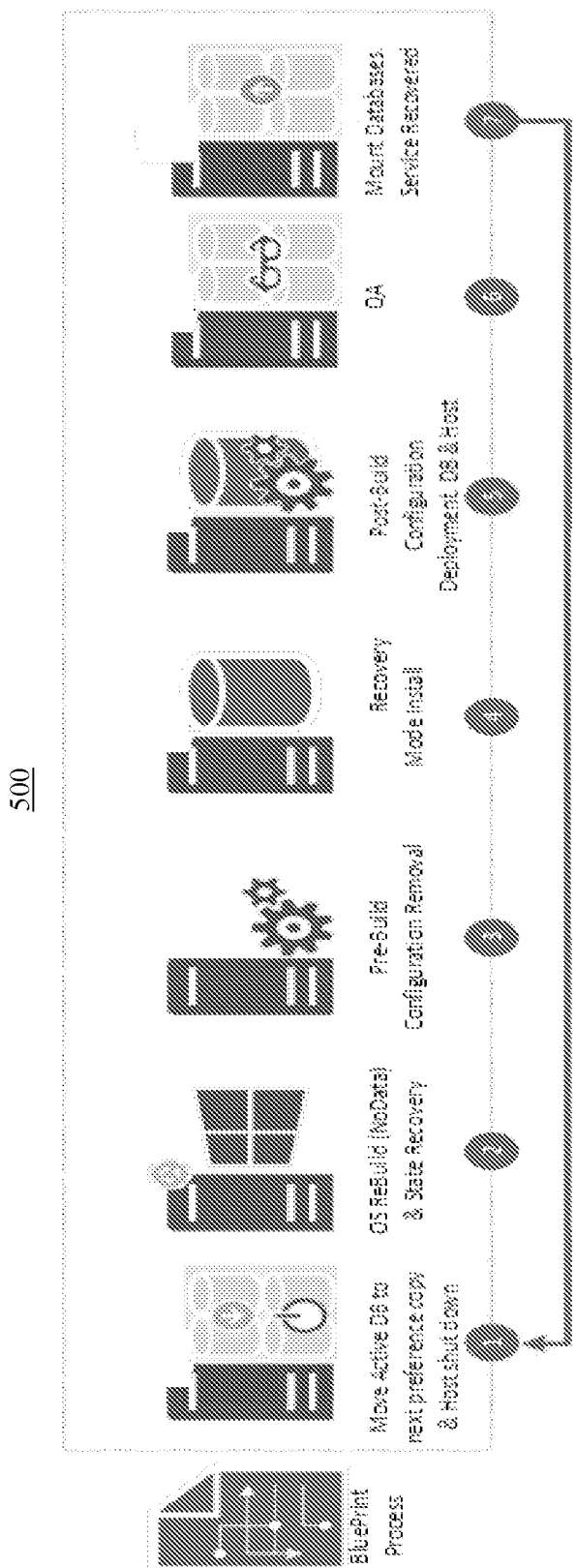
FIG. 5 is a flow diagram that illustrates an exemplary process for implementing a method for implementing a method for automatically reconstructing an application in order to update application nodes end-to-end or, in the case of a disaster, to quickly recover and restore the application nodes end-to-end, with their data, to a state that the application nodes had before the disaster.

FIG. 5 is a flow diagram 500 that illustrates an exemplary process for implementing a method for implementing a method for automatically reconstructing an application in order to update application nodes end-to-end or, in the case of a disaster, to quickly recover and restore the application nodes end-to-end, with their data, to a state that the application nodes had before the disaster.

As illustrated in flow diagram 500, in an exemplary embodiment, after a blueprint process has been created, in a first stage, automated application reconstruction tool module 302 may move an active database, from a current host platform that is associated with an application, to a backup memory. A blueprint process may include one or more workflows. Automated application reconstruction tool module 302 may utilize a workflow created for the purpose of backing up a database, in order to move an active database, from a current host platform that is associated with an application, to a backup memory. A current host platform that is associated with an application may include one or more clusters, which each may include a plurality of nodes. Moving an active database to a backup memory may include deactivating the active database from the current host platform that is associated with the application. Deactivating a database from a host platform may include shutting down the active database of the host platform.

In a second stage, automated application reconstruction tool module 302 may rebuild an operating system of an application. Rebuilding an operating system of an application may include recovering a state that the operating system of the application had before the operating system of the application was rebuilt. Automated application reconstruction tool module 302 may utilize a workflow created for the purpose of rebuilding an operating system, in order to rebuild an operating system of an application.

In a third stage, automated application reconstruction tool module 302 may remove a pre-build configuration of an application. Automated application reconstruction tool module 302 may utilize a workflow created for the purpose of removing a pre-build configuration of an application, in order to remove a prebuild configuration of an application.

In a fourth stage, automated application reconstruction tool module 302 may install a recovery mode of an application. Automated application reconstruction tool module 302 may utilize a workflow created for the purpose of installing a recovery mode of an application, in order to install a recovery mode of an application. Installing a recovery mode of an application may include, or may be followed by, a synchronization of an execution of the recovery mode of the application across a plurality of nodes of a cluster of a platform of the application.

In a fifth stage, automated application reconstruction tool module 302 may deploy a post-build configuration of an application. Automated application reconstruction tool module 302 may utilize a workflow created for the purpose of deploying a post-build configuration of an application, in order to deploy a post-build configuration of an application. Deploying a post-build configuration of an application may include, or may be followed by, a synchronization of an execution of the post-build configuration of the application across a plurality of nodes of a cluster of a platform of the application.

In a sixth stage, automated application reconstruction tool module 302 may perform a quality assurance process. Automated application reconstruction tool module 302 may utilize a workflow created for the purpose of performing a quality assurance process, in order to perform a quality assurance process. Performing a quality assurance process may include validating a post-build configuration of an application. Validating a post-build configuration of an application may include evaluating parameters of the post-build configuration of an application, evaluating a workflow, or both.

A validation of a post-build configuration of an application may determine whether to request a change to the post-build configuration of the application. For example, when a validation of a post-build configuration of an application indicates an invalidity, automated application reconstruction tool module 302 may request a change that addresses the invalidity. Additionally, once the invalidity has been addressed, automated application reconstruction tool module 302 may perform another quality assurance process. A change to the post-build configuration of the application may require a generation of a change ticket.

After validating the post-build configuration of the application, automated application reconstruction tool module 302 may perform a workflow created for the purpose of reconstructing an application. Performing a workflow may include executing a sequence of microservice operations that are included within the workflow. When execution of a sequence of microservice operations is successful, automated application reconstruction tool module 302 may transmit, to a predetermined destination, a notification that each of the microservice operations has been successfully executed. The result of the execution of the sequence of microservice operations may be displayed on a graphical user interface (GUI).

In a seventh stage, automated application reconstruction tool module 302 may mount one or more databases. Automated application reconstruction tool module 302 may mount one or more databases by transferring a copy of an active database, from a backup memory, to a current host platform of an application. Automated application reconstruction tool module 302 may utilize a workflow created for the purpose of mounting one or more databases, in order to transfer a copy of an active database, from a backup memory, to a current host platform of an application. Performing a workflow may include executing a sequence of microservice operations that are included within the workflow.

When an execution of a sequence of microservice operations that are included within a workflow created for the purpose of mounting one or more databases, and an execution of a sequence of microservice operations that are included within a workflow created for the purpose of reconstructing an application, are both successful, then a reconstructed application may be executed, and services of the application may be provided or fully restored.

Accordingly, with this technology, an optimized process for automatically reconstructing an application in order to update application nodes end-to-end or, in the case of a disaster, to quickly recover and restore the application nodes end-to-end, with their data, to a state that the application nodes had before the disaster is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for automated reconstruction of an application, the method being implemented by a processor that comprises one or more devices, the method comprising:
    receiving, by the processor, a workflow that comprises a sequence of microservice operations that correspond to the application;
    transferring, by the processor, from a current host platform that is associated with the application, to a backup memory, a copy of an active database that is associated with the application;
    deactivating, by the processor, the active database from the current host platform;
    rebuilding, by the processor, an operating system of the application;
    removing, by the processor, a pre-build configuration of the application;
    installing, by the processor, a recovery mode of the application on the current host platform;
    executing, by the processor, an artificial intelligence (AI) algorithm that implements a machine learning technique that determines a set of parameters for a post-build configuration of the application, wherein the AI algorithm is trained by using historical data that relates to at least one previous reconstruction of the application;
    deploying, by the processor, the post-build configuration of the application;
    performing, by the processor, a quality assurance process that comprises validating the post-build configuration of the application; and
    transferring, by the processor, from the backup memory, to the current host platform, the copy of the active database.

2. The method of claim 1, wherein the application comprises a monolithic software application.

3. The method of claim 1, wherein the workflow further comprises a directed acyclic graph (DAG) that indicates an order by which the microservice operations are executed when the workflow is performed.

4. The method of claim 1, further comprising:
synchronizing, by the processor, an execution of the application across a plurality of nodes, wherein the current host platform comprises a cluster that comprises the plurality of nodes.

5. The method of claim 1, further comprising:
after validating the post-build configuration of the application, executing, by the processor, the sequence of microservice operations; and
when an executing the sequence of microservice operations is successful, transmitting, by the processor, to a predetermined destination, a notification that each of the microservice operations has been successfully executed.

6. The method of claim 5, further comprising:
displaying, by the processor, on a graphical user interface (GUI), a result of the executing the sequence of microservice operations.

7. The method of claim 1, wherein the validating the post-build configuration of the application comprises:
evaluating parameters of the post-build configuration; and
evaluating the workflow.

8. The method of claim 1, wherein the validating the post-build configuration of the application comprises:
determining whether to request a change to the post-build configuration of the application.

9. The method of claim 1, further comprising:
after validating the post-build configuration of the application, executing, by the processor, the sequence of microservice operations; and
when execution of the sequence of microservice operations is successful, executing, by the processor, the post-build configuration of the application.

10. The method of claim 1, wherein initial microservice operations from among the sequence of microservice operations comprise pre-requisite installations of binaries of the application.

11. A system for automated reconstruction of an application, the system comprising:
a communication interface;
a processor coupled to the communication interface and comprising one or more devices; and
a memory coupled to the communication interface and storing executable instructions that cause the processor to:
receive a workflow that comprises a sequence of microservice operations that correspond to the application;
transfer, from a current host platform that is associated with the application, to a backup memory, a copy of an active database that is associated with the application;
deactivate the active database from the current host platform;
rebuild an operating system of the application;
remove a pre-build configuration of the application;
install a recovery mode of the application on the current host platform;
execute an artificial intelligence (AI) algorithm that implements a machine learning technique that determines a set of parameters for a post-build configuration of the application, wherein the AI algorithm is trained by using historical data that relates to at least one previous reconstruction of the application;
deploy the post-build configuration of the application;
perform a quality assurance process that comprises validating the post-build configuration of the application; and
transfer, from the backup memory, to the current host platform, the copy of the active database.

12. The system of claim 11, wherein the application comprises a monolithic software application.

13. The system of claim 11, wherein the workflow further comprises a directed acyclic graph (DAG) that indicates an order by which the microservice operations are executed when the workflow is performed.

14. The system of claim 11, wherein the executable instructions further cause the processor to:
synchronize an execution of the application across a plurality of nodes, wherein the current host platform comprises a cluster that comprises the plurality of nodes.

15. The system of claim 11, wherein the executable instructions further cause the processor to:
after the validating the post-build configuration of the application, execute the sequence of microservice operations; and
when an executing the sequence of microservice operations is successful, transmit, to a predetermined destination, a notification that each of the microservice operations has been successfully executed.

16. The system of claim 15, wherein the executable instructions further cause the processor to:
display, on a graphical user interface (GUI), a result of the execution of the sequence of microservice operations.

17. The system of claim 11, wherein the validating the post-build configuration of the application comprises:
evaluating parameters of the post-build configuration; and
evaluating the workflow.

18. The system of claim 11, wherein the validating the post-build configuration of the application comprises:
determining whether to request a change to the post-build configuration of the application.

19. The system of claim 11, wherein the executable instructions further cause the processor to:
after the validating the post-build configuration of the application, execute the sequence of microservice operations; and
when an executing the sequence of microservice operations is successful, execute the post-build configuration of the application.

20. The system of claim 11, wherein initial microservice operations from among the sequence of microservice operations comprise pre-requisite installations of binaries of the application.

* * * * *